(12) United States Patent
Hartford et al.

(10) Patent No.: US 10,664,190 B1
(45) Date of Patent: May 26, 2020

(54) GEOGRAPHICALLY DISPERSED DATA PROTECTION AND REPLICATION

(71) Applicant: Hitachi Vantara Corporation, Santa Clara, CA (US)

(72) Inventors: Joseph Hartford, Waltham, MA (US); Aksel Allouch, Waltham, MA (US); Ferenc Gyurcsan, Waltham, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 16/261,732

(22) Filed: Jan. 30, 2019

(51) Int. Cl.
*G06F 3/06* (2006.01)
*G06F 16/27* (2019.01)
*G06F 16/188* (2019.01)

(52) U.S. Cl.
CPC .............. *G06F 3/065* (2013.01); *G06F 3/067* (2013.01); *G06F 3/0619* (2013.01); *G06F 16/27* (2019.01); *G06F 16/188* (2019.01)

(58) Field of Classification Search
CPC .......... G06F 3/065; G06F 3/067; G06F 16/27; G06F 16/176; G06F 16/184; G06F 16/188; G06F 16/192; G06F 11/2094
See application file for complete search history.

(56) References Cited

U.S. PATENT DOCUMENTS 8,700,571 B2   4/2014  Rogers et al.
2012/0079424 A1*  3/2012  Rogers ................ G06F 11/2094
                                                            715/810

* cited by examiner

*Primary Examiner* — Ernest Unelus
(74) *Attorney, Agent, or Firm* — Mattingly & Malur, PC

(57) ABSTRACT

In some examples, a first system may store a data object according to a first data protection level and may send the data object to a geographically remote second system for storing as a replicated data object. Based on determining that a condition for transitioning the data object to a different data protection level has been met, the first system may check a local data structure to determine that the data object was sent to the second system. Based on determining that the data object was sent for replication to the second system, the first system may send a request to the second system to verify storage of the replicated data object at the second system. Based on receiving a reply indicating storage of the replicated data object at the second system, the first system may transition the data object to the different data protection level.

18 Claims, 15 Drawing Sheets

|  | INGESTED AT FIRST SITE | INGESTED AT SECOND SITE |
|---|---|---|
| STORED ON LOCAL STORAGE AT FIRST SITE STORAGE | NOT CONSIDERED TO BE GEOGRAPHICALLY DISPERSED 302 | CONSIDERED TO BE GEOGRAPHICALLY DISPERSED 308 |
| STORED ON CLOUD STORAGE BY FIRST SITE STORAGE | NOT CONSIDERED TO BE GEOGRAPHICALLY DISPERSED 304 | CONSIDERED TO BE GEOGRAPHICALLY DISPERSED 310 |
| STORED ON LOCAL STORAGE AT SECOND SITE STORAGE | CONSIDERED TO BE GEOGRAPHICALLY DISPERSED 306 | NOT CONSIDERED TO BE GEOGRAPHICALLY DISPERSED 312 |

|  | Object Ingested At First Site System | Object Ingested At Second Site System | Object Ingested At Third Site System |
|---|---|---|---|
| Object Replicated To First Site System |  | Considered To Be Geographically Dispersed 1106 | Considered To Be Geographically Dispersed 1110 |
| Object Replicated To Second Site System | Considered To Be Geographically Dispersed 1102 |  | Not Considered To Be Geographically Dispersed (Geographic Distance Fails) 1112 |
| Object Replicated To Third Site System | Considered To Be Geographically Dispersed 1104 | Not Considered To Be Geographically Dispersed (Geographic Distance Fails) 1108 |  |

GEOGRAPHICALLY DISPERSED DATA PROTECTION AND REPLICATION

BACKGROUND

Data objects may be stored in an object storage architecture that manages data as objects. To prevent data loss, administrators and other users of object storage solutions in geographically distributed replicated environments may be concerned with meeting specified data protection levels across their storage systems at all times, irrespective of failure conditions, such as disk failure, node failure, communication network congestion or failure, or even complete failure of a site. For instance, in replicated disaster recovery environments, the distances may typically be large and failure conditions can vary on a wide scale. In some cases, the systems at each site may be loosely coupled to the rest of the systems in the replicated infrastructure over long network distances.

In these types of object storage systems, when a site determines data protection levels for a given object, the site might not take into consideration whether another site has stored a replication of each of the objects or what state the replicated object is in at the other site. Accordingly, object storage users may have to choose between utilizing an excessive amount of storage by configuring high data protection levels at all of their storage sites or else taking the risk of not meeting sufficient data protection levels under some circumstances. The latter situation may result in failure to meet regulatory compliance, which may cause reputation damage and fines in addition to the direct costs associated with the potential loss of corporate data.

SUMMARY

In some implementations, a first system at a first site may store a data object according to a first data protection level and may send the data object to a second system at a geographically remote second site for storing as a replicated data object. Based on determining that a condition for transitioning the data object to a different data protection level has been met, the first system may check a local data structure to determine that the data object was sent to the second system. Based on determining that the data object was sent for replication to the second system, the first system may send a request to the second system to verify storage of the replicated data object at the second system. Based on receiving a reply indicating storage of the replicated data object at the second system, the first system may transition the data object to the different data protection level.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example data structure for management of replicated instances according to some implementations.

FIG. 11 illustrates an example data structure for determining whether an object is sufficiently geographically dispersed in the case of three storage sites according to some implementations.

DESCRIPTION

Figure 1:
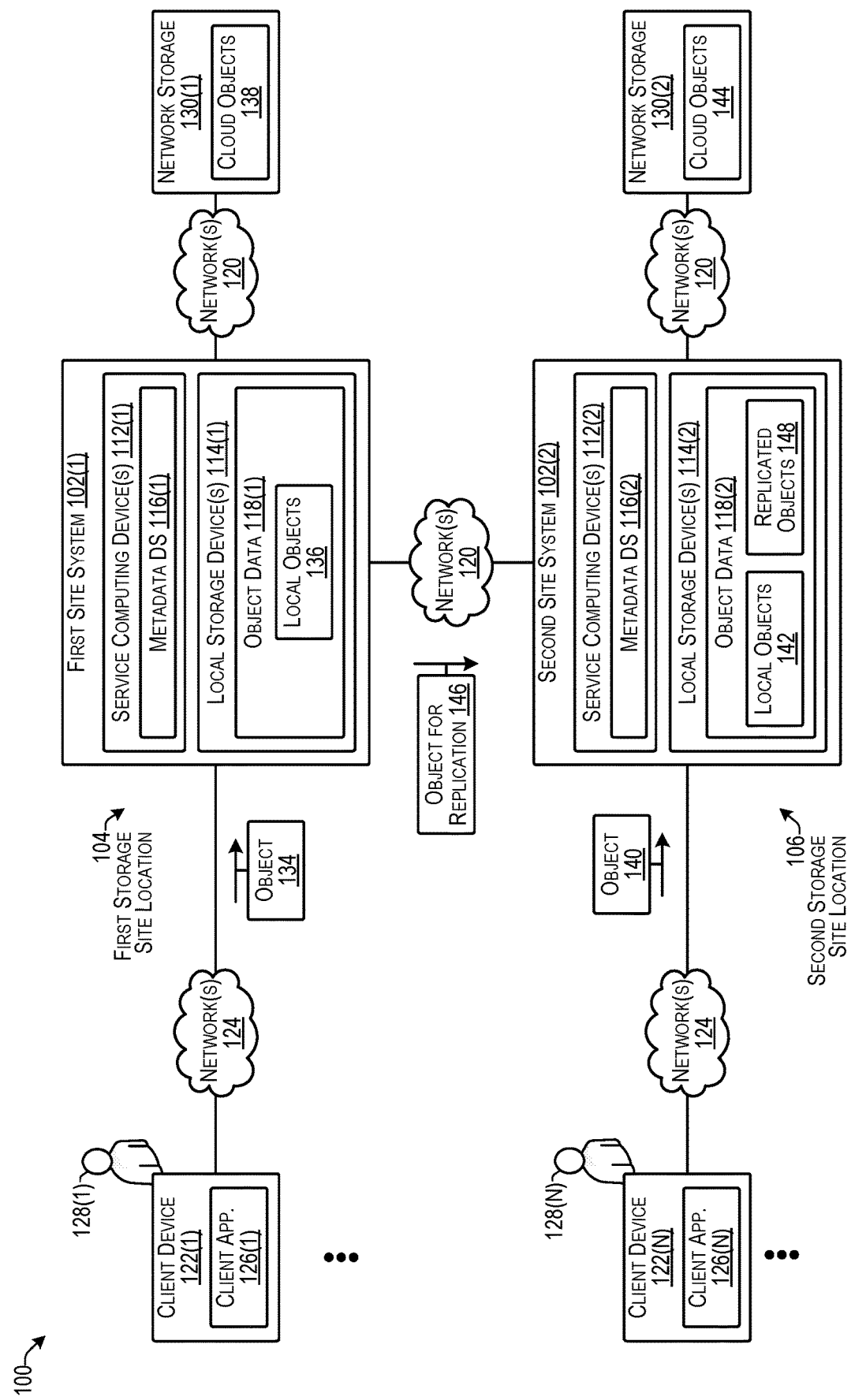
FIG. 1 illustrates an example architecture of a distributed storage system configured for storing and replicating objects according to some implementations.

Some implementations herein include techniques and arrangements for optimizing storage utilization of a geographically dispersed storage system, such as to enable the system to operate at full capacity, while also ensuring that the system automatically adjusts data protection levels (DPLs) when specified data protection levels are not met due to a system failure. Further, some examples may mitigate suboptimal storage utilization in a geographically dispersed replicated object storage system. For instance, intelligence may be introduced into the data protection level logic to determine whether replication has taken place for a particular object. Thus, a replication event may be taken into consideration in the storage life cycles of individual objects. In some examples, after object replication takes place and the object storage system determines that another site has reliably received and stored the data (e.g., thereby meeting a data protection level obligation), one or more of the storage sites are able to relax their own data protection levels.

In some cases, each stored object may typically include the object data (e.g., the data content), metadata that describes the object, and a globally distinguishable identifier. In some implementations, the storage system may be configured to reliably identify whether an object has been replicated. To do so in an efficient and reliable manner, the system may employ local information at a local site to determine whether object replication has been performed locally, and may also send a call to a remote site to verify that the remote site also agrees that the object has been successfully replicated. In some cases, the call to the remote site may only be performed under certain conditions, which results in efficient, effective and speedy replication verification.

As one example, the production site might store two instances of a data object, and a data recovery site might store one instance of the object that has been replicated to the data recovery site. This way, specified data protection levels for each object may be met across the geographically dispersed replicated object storage system. Further, implementations herein provide flexibility to not only specify the number of instances for a data protection level, but may also specify the storage location for the instances of the object. For example, the system can specify that, until the object is replicated, the object must remain in storage on local storage arrays at a first site. Additionally, after the object is replicated, one instance of the two local instances of the data may be required to reside on local storage array, and one instance may be tiered off to a potentially lower-priced cloud storage solution, or the like. Further, the location of the data storage can provide data protection in addition to having more than one instance of the data object stored.

In some cases, the storage tiering herein may be dependent on whether an object has been replicated, e.g., whether instances of the object are available at other storage sites that are geographically remote from a first storage site. Thus, some examples include a criterion that forces storage tiering to also consider replication events in a decision flow. Further, when linking replication to storage tiering in an object storage environment, the replication may be verified in a robust and efficient manner. For example, due to the potentially very large number of objects to be verified, efficiency in performing replication verification, as described herein, may provide a solution to a problem of scaling in the storage system to enable storage of a very large number of objects.

As one example, the system may include a two-site, geographically dispersed replicated disaster recovery object storage configuration. For instance, suppose that a user may desire to ensure that there are three instances of an object at any given time, such as to meet a required data protection level. The user may specify the data protection level configuration at a first site, referred as the production site. For example, a user may specify at ingest time that the first site is to store three instances of the object (e.g., DPL=3 Local storage). In addition, the user may specify that after replication has taken place at the second site and, e.g., 30 days have elapsed after the ingest time, the data protection level may be lowered to DPL=2, i.e., two instances are maintained by the first site. Thus, two instances are maintained by the first site and one replicated instance is maintained by the second site.

In this example, the second site may serve as local storage for some users and may also serve as a replication and data recovery site for the first site. Thus, the data protection level for the second site may also be configured to store three instances of objects at ingest time (DPL=3 Local storage) for newly received data objects received from local users. However, for data objects being replicated from the first site, this data protection level (DPL=3 Local storage) might not be applied to the objects replicated from the first site. Instead, the second site might only store one instance of the objects received from the first site for data replication. Further, suppose that at the second site, after replication of data stored at the second site takes place at another site (which may be the first site, or may be a different, third site), the data protection level might be lowered to DPL=2 or DPL=1 after a specified time, depending on the DPL requirements for the particular data.

Additionally, in complex multi-site geographically dispersed object storage systems with more than two storage sites, the number of object instances stored across the entire dispersed storage system topology may be considered. Further, hybrid cloud data placement policies may be employed in some cases. For example, a storage policy may specify that data can only be moved from local storage into a cloud environment after the data has been replicated safely across the geographically dispersed object storage topology. Implementations herein may employ geographically aware intelligence along with determinations of data protection levels and type of storage. For instance, data object instances stored in certain countries (for example, countries with high geo-political or environmental disaster risks) might not be considered as a "safe" remote location for storing replicated data for data recovery, and this determination may impact data placement and protection level policy calculations.

For discussion purposes, some example implementations are described in the environment of a plurality of site systems in communication with each other for storing and replicating data objects. However, implementations herein are not limited to the particular examples provided, and may be extended to other types of computing and storage system architectures, other types of storage environments, other types of client configurations, other types of data, and so forth, as will be apparent to those of skill in the art in light of the disclosure herein.

FIG. 1 illustrates an example architecture of a distributed storage system 100 configured for storing and replicating objects according to some implementations. A plurality of site systems 102(1), 102(2) are arranged in the distributed storage system 100 at a plurality of respective storage site locations 104, 106. For example, a first site system 102(1) is located at a first storage site location 104 and a second site system 102(2) is located at a second storage site location 106. Furthermore, while two site systems 102 and storage site locations 104 and 106 are illustrated in this example, the number of site systems and storage site locations in other examples is not limited to two, and may be two or more site systems, such as ranging between two and several hundred site systems.

Each site system 102 may include at least one service computing device 112 and at least one local storage device 114. Accordingly, one or more service computing devices 112(1) and one or more local storage devices 114(1) may be included in the first site system 102(1) and one or more service computing devices 112(2) and one or more local storage devices 114(2) may be included in the second system 102(2). Furthermore, while the service computing device(s) 112 and the local storage device(s) 114 are illustrated as separate in this example, in other examples, the local storage device(s) 114 may be incorporated into or may be otherwise included in the service computing devices(s) 112, as discussed additionally below. Further, the site systems 102 are not limited to the hardware configurations described and illustrated in this disclosure, but may include any suitable or desired hardware configuration able to serve as object storage and perform the functions described herein, and the hardware configuration at one of the site systems 102 may be different from that at another one of the site systems 102.

In some cases, the service computing devices 112 in each site system 102(1) and 102(2) may include, maintain, or otherwise access a metadata data structure 116(1) and 116(2), respectively, that is used to store metadata about object data 118(1) and 118(2), respectively, that is stored on the local storage device(s) 114(1) and 114(2), respectively, at the respective systems 102(1) and 102(2). For example, the metadata data structure 116 may be a database, a table, or any other suitable data structure. The metadata included in the metadata data structure 116 may include information about each respective stored object, such as path, name, owner, hash value determined from the object data, and so forth.

The site systems 102(1) and 102(2) are able to communicate with each other over one or more networks 120. The one or more networks 120 may include any suitable network, including a wide area network (WAN), such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 120 may include both wired and/or wireless communication technologies. Components used for such communications can depend at least in part upon the type of network, the environment selected, or both. Protocols for communicating over such networks are well known and will not be discussed herein in detail. Accordingly, the service computing devices 112 are able to communicate over the one or more networks 120 using wired or wireless connections, and combinations thereof.

In addition, at least some of the service computing devices 112 are able to communicate with a plurality of client devices 122(1)-122(N) through one or more networks 124. Each client device 122(1)-122(N) may include a respective instance of a client application 126(1)-126(N) that may execute on the respective client device 122(1)-122(N), such as for communicating with a respective service computing device 112, e.g., for sending data objects for storage by the site systems 102 and/or for retrieving stored objects from the site systems 102. Users 128(1)-128(N) may be associated with the respective client devices 122(1)-122(N). In some cases, the application 126 may include a browser or may operate through a browser, while in other cases, the application 126 may include any other type of application having communication functionality enabling communication with the service computing devices 112 over the one or more networks 124.

The one or more networks 124 may be a LAN in some examples. In other examples, the one or more networks 124 may be any of the networks discussed above with respect to the one or more networks 120. In some cases, the users 128 and/or the client devices 122 or client applications 126 may be assigned to access the service computing device(s) 112 at a particular storage site location 104 or 106 of the plurality of storage site locations. For example, if the first storage site location 104 is located in Boston, and the user 128(1) is an employee who works in the Boston area, the user 128(1) may be assigned to access the service computing device(s) 112(1), rather than the other service computing devices 112(2) at the second storage site location 106.

In some examples, various users 128 or groups of users 128 may only be granted access to certain ones of the service computing device(s) 112 at certain ones of the storage locations 104 or 106, such as for load balancing, limiting employee access to the local office system, and so forth. Furthermore, while two site systems 102(1) and 102(2) and storage site locations 104 or 106 are shown in this example, in other examples, a different number of systems/storage locations may be used, such as more than two, with the upper limit being based on practicality and diminishing returns, rather technical feasibility.

In addition, the first site system 102(1) may be able to communicate over the one or more networks with a first network storage 130(1), and the second site system 102(2) may be able to communicate over the one or more networks 120 with a second network storage 130(2) that is different from the first network storage 130(2). For example, the first network storage 130(1) may be geographically remote from the second network storage 130(2). In some cases, the network storages 130(1) and 130(2) may be referred to as "cloud storage" or "cloud-based storage", and may enable a lower cost storage solution per megabyte/gigabyte than the local storage devices 114.

In this example, suppose that the first user 128(1) uses the first site system 102(1) for storage of data objects. For instance, the first user 128(1) may send an object 134 to the service computing device 112(1) for storage by the first site system 102(1). As discussed additionally below, the first site system 102(1) may be obligated to store the object 134 according to a specified data protection level, which may include storage as a local object 136 on the local storage device(s) 114(1) and/or as a cloud object 138 on the network storage 130(1).

Similarly, the second user 128(N) may use the second site system 102(2) for storage of data objects. For instance, the second user 128(2) may send an object 140 to the service computing device 112(2) for storage by the second site system 102(2). As discussed additionally below, the second site system 102(2) may be obligated to store the object 140 according to a specified data protection level, which may include storage as a local object 142 on the local storage device(s) 114(2) and/or as a cloud object 144 on the network storage 130(2), and may replicate the object 140 to another storage site in the system 100, which may or may not be the first storage site location 104. In some cases, the data protection levels used at the first site system 102(1) may be different from those used as the second site system 102(2). In other examples, however, the data protection levels used at the first site system 102(1) and the second site system 102(2) may be the same.

In addition, in this example, suppose that the second site system 102(2) serves as a data recovery site for the first site system 102(1). Accordingly, as part of the data protection level implemented at the first site system 102(1), the service computing device 112(1) may send an instance (i.e., a copy) of the object 134 as an object for replication 146 to the second site system 102(2). The second site system 102(2) may store the received object for replication 146 as a replicated object 148 in the local storage device(s) 114(2). As discussed additionally below, the first site system 102(1) may subsequently communicate with the second site system 102(2) to perform verification that the object 134 has been successfully replicated by the second site system 102(2). The verification may then be used, possibly in conjunction with satisfaction of one or more other conditions, for changing a data protection level for the object 134.

The distributed object storage system 100 herein may be deployed in a geographically distributed manner, such as for data recovery and/or concurrent access purposes. Asynchronous data replication may be employed to transfer data to one or more remote site systems 102. Asynchronous replication may provide no guarantee regarding when data will be replicated. For example, replication may build up a backlog due to resource constraints. For instance, in some cases, an object may not be replicated for days or even months after data ingestion. Accordingly, implementations herein perform verification to ensure that data has been properly replicated.

The distributed object storage system 100 herein may also include a number of data protection features, such as whereby both location and redundancy levels are able to be specified for data protection. In some examples, this may be referred to as "storage tiering" by which a tiering configuration specifies on which site system and storage devices a particular data object should reside, as well as how many instances of the object must be preserved at each of those storage sites/devices. In some examples, the storage devices may include internal disks, some form of attached storage, such as an array, or a cloud-type storage solution, such as a network storage location. Conditions to be satisfied for transitioning from one storage tier to another storage tier may include an amount of time elapsed since data ingestion, the current utilized capacity of the storage solution, and verification that replication is completed.

In the examples herein, the storage system 100 may include a geographically dispersed replicated environment in which multiple site systems 102 replicate data for each other in a wide area network topology. The data replication may be performed asynchronously with respect to an input/output (I/O) path. For example, data may be buffered at the production site system 102, and as the wide area network bandwidth allows, may be replicated to the data recovery site system 102. Further, storage tiering may include a method by which data is placed on certain storage devices, e.g., within the boundaries of a site and on different storage devices during the storage lifecycle of the data and depending on various conditions having been met.

Figure 2:
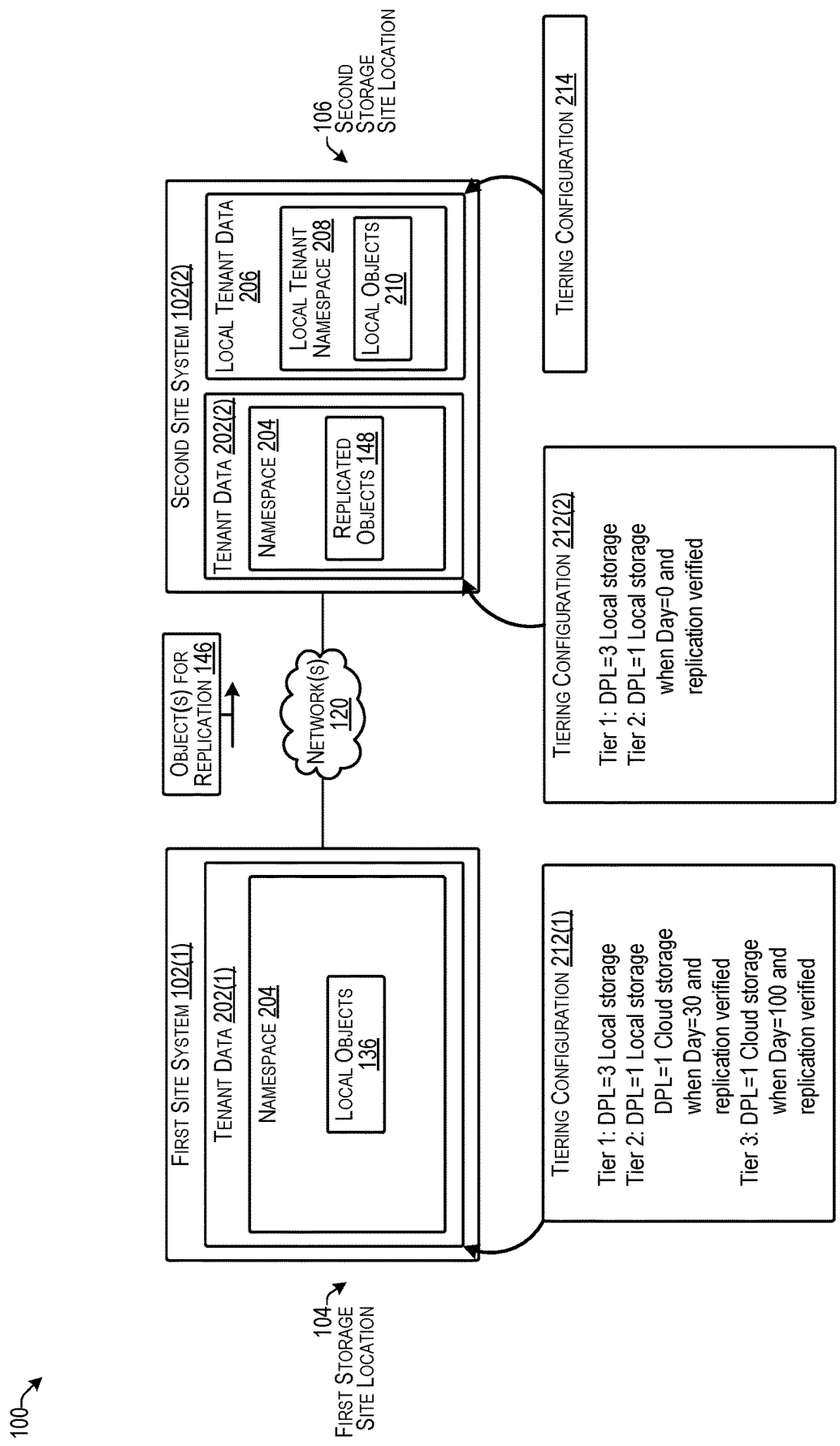
FIG. 2 illustrates an example configuration of the geographically dispersed storage system according to some implementations.

FIG. 2 illustrates an example configuration of the geographically dispersed storage system 100 according to some implementations. In this example, the data may be partitioned according to tenant. For example, different tenants (e.g., users of the distributed object storage system 100) may have different data protection level requirements, such as based on regulatory or government requirements, industry standards, customer expectations, or the like. Further, different tenants may have different namespaces. A namespace may serve as a collection of objects. Each namespace may include a private filesystem with respect to other namespaces. Moreover, access to one namespace does not grant a user access to another namespace.

In some examples herein, a tenant may include one or more namespaces and may possibly include subtenants. A top-level tenant may be a tenant that has no parent tenant, e.g., an enterprise, corporation, organization, or other entity. A subtenant may include a tenant whose parent is another tenant, e.g., an enterprise's financing department may be a subtenant of the top-level tenant, which is the enterprise. A default tenant may be the top-level tenant that contains only a default namespace. Furthermore, a tenant may be implemented as a hierarchy in that the tenant can contain subtenants.

A tenant preferably has a set of attributes, such as one or more namespaces, administrative accounts, data access accounts, a permission mask, a roll-up of states, names, quotas, and so forth. For example, a tenant may have a set of administrative accounts that enable users to monitor and update attributes of the tenant. In addition, data access accounts may include a set of user accounts that are able to access namespace objects. In some examples, a system administrator may have the ability to set system data tiering plans and data protection level values for each tenant and/or each namespace using each site storage system 102 of the various site systems 102 in the overall distributed storage system 100.

In this example, there are two storage site locations 104 and 106 that are geographically distributed including the first site system 102(1) at the first storage site location 104 and the second site system 102(2) at the second storage site location 106. For purposes of this example, suppose that the first site system 102(1) serves as a production site (e.g., where ingest of new or updated data objects occurs), and the second site system 102(2) serves as a data recovery site for the first site system 102(1). Accordingly, data objects may be replicated from the first site system 102(1) to the second site system 102(2) using asynchronous data replication.

The first site system 102(1) includes the tenant data 202(1) for a corresponding tenant that is stored in a namespace 204. Accordingly, local objects 136 associated with the tenant may be stored in the namespace 204. In addition, the second site system 102(2) may include tenant data 202(2) for the same tenant, and may also include the namespace 204 for the tenant data. Thus, replicated objects associated with the tenant may be stored in the namespace 204 in the tenant data 202(2) of the second site system 102(2).

In addition, the second site system 102 may include local tenant data 206 including a local tenant namespace 208 and local objects 210. For example, as mentioned above, local users associate with a local tenant may store local objects at the second site system 102, which may be replicated to one or more other sites in the storage system 100.

Each site system 102 may include a tearing configuration 212 that specifies how data is to be protected for a particular tenant and/or a particular namespace. In this example, the storage tiering configuration 212(1) at the first site system 102 for the tenant data 202(1) includes first tier, Tier 1, which takes effect during object ingest and which specifies data protection level DPL=3 Local storage, which indicates that three instances of the object should be maintained on the local (e.g., internal) storage devices.

Subsequently, Tier 2 data protection level may be implemented after 30 days have elapsed since initial ingestion and after replication to the data recovery site (i.e., second site system 102(2) in this example) has been verified. Tier 2 requirements in this example include "DPL=1 Local storage" i.e., one instance of the object stored on a local device, and "DPL=1 Cloud storage", i.e., one instance of the object may be stored in at a network storage location (aka cloud storage).

In addition, following the elapse of 100 days after ingest and after replication of the object to the second site system 102(2) has been verified, Tier 3 storage data protection level may be implemented. In this example, under Tier 3 "DPL=1 Cloud storage", one instance of the object may be stored as a cloud object at the network storage location. An additional instance of the object is stored as a replicated object at the second system site 102(2).

The storage tiering configuration 212(2) for the tenant data 202(2) at the second site system 102(2) may be applied in the case when the second site system 102(2) hosts a production instance of the tenant data 202(2), such as when there has been a disaster recovery failover event at the first site system 102(1). The tiering configuration 212(2) in this example includes an ingest Tier 1 DPL=3 Local storage, in which if data is not replicated, three instances of the ingested object are stored on the local storage devices at the second site system 102(2). Subsequently, following verification of replication to another site, Tier 2 may be applied to the data object, i.e., 0 days after ingest and data replication has been verified, then "DPL=1 Local storage", and the second site system 102(2) stores one instance of the object on the local storage devices.

Furthermore, the local tenant data 206 may have a different tiering configuration 214 applied to the local tenant data 206, but the details of the tiering configuration 214 are not relevant to the present example. For instance, a number of other local tenants or subtenants may use the second site system 102(2) in some cases. Alternatively, in other cases, the second site system may be used solely by the same tenant as the first site system 102(1). Various other variations will be apparent to those of skill in the art having the benefit of the disclosure herein.

FIG. 3 illustrates an example data structure 300 for management of replicated instances according to some implementations. For instance, the data structure 300 may be used to determine whether a storage location is geographically dispersed and a selected object is considered to be stored safely. In particular, implementations herein consider (1) whether a storage location is sufficiently geographically dispersed, and (2) whether an object is stored safely at that location.

For the first criterion, implementations herein may apply a rule that any other site system that is designated as a replication site for a first site may be considered to be geographically dispersed. As discussed additionally below, this consideration may be expanded to include geo-location information for a more autonomous verification. Furthermore, some sites may be designated as non-secure and/or non-geographically-dispersed for certain other sites, such as in the case that a particular site is closer than a threshold distance dictated by regulatory compliance for business continuity purposes, or the like.

For the second criterion, various factors can be taken into consideration, some examples of which are discussed below. In the examples, the order of the examples below reflects an increasing computational cost of the operation:

1. Has the object been sent for replication? This information may be obtained from locally available information. As one example, the local metadata data structure 116 discussed above may be configured to include an indication as to whether an instance of the object was sent to the data recovery site.

2. Is the object's metadata known at the data recovery site? This information requires communication with the data recovery site.

3. Is the object metadata-only at the data recovery site? For example, there may be instances when it is desired to not store an actual copy of the object data at a site, but only the object's metadata. In this case, the object would not be considered safely stored at that site. This information requires communication with the data recovery site.

4. Has the object's data been written to disk on the data recovery site? This information requires communication with the data recovery site.

5. Is a hash of the object data stored at the data recovery site equal to hash of the object data stored on the ingest site? This information requires communication with the data recovery site and some processing at the data recovery site and the ingest site.

As discussed additionally below, to balance computational cost with verification that the object has been replicated, some examples herein may only consider the first three factors (1-3) set forth above, and may rely on the data recovery site's data protection capabilities out-of-band to ensure that items 4 and 5 are satisfied. Additionally, in some cases, an instance of the object that is stored in the cloud, i.e., at a network storage location, may be considered a safely stored instance, but might not be considered to be geographically dispersed.

In the data structure 300, the second site has been designated as a data recovery site for the first site, and therefore meets the minimum threshold distance for being geographically dispersed with respect to the first site. In the data structure 300, when a data object is ingested at the first site, and is stored on local storage at the first site, then, as indicated at 302, the object is not considered to be geographically dispersed. When the data object is ingested at the first site, and is stored on cloud storage by the first site, then, as indicated at 304, the object is not considered to be geographically dispersed. When the data object is ingested at the first site, and is stored on local storage at the second site, then, as indicated at 306, the object is considered to be geographically dispersed.

Furthermore, when a data object is ingested at the second site, and is stored on local storage at the first site, then, as indicated at 308, the object is considered to be geographically dispersed. When the data object is ingested at the second site, and is stored on cloud storage by the first site, then, as indicated at 310, the object is considered to be geographically dispersed. When the data object is ingested at the second site, and is stored on local storage at the second site, then, as indicated at 312, the object is not considered to be geographically dispersed.

Figure 4:
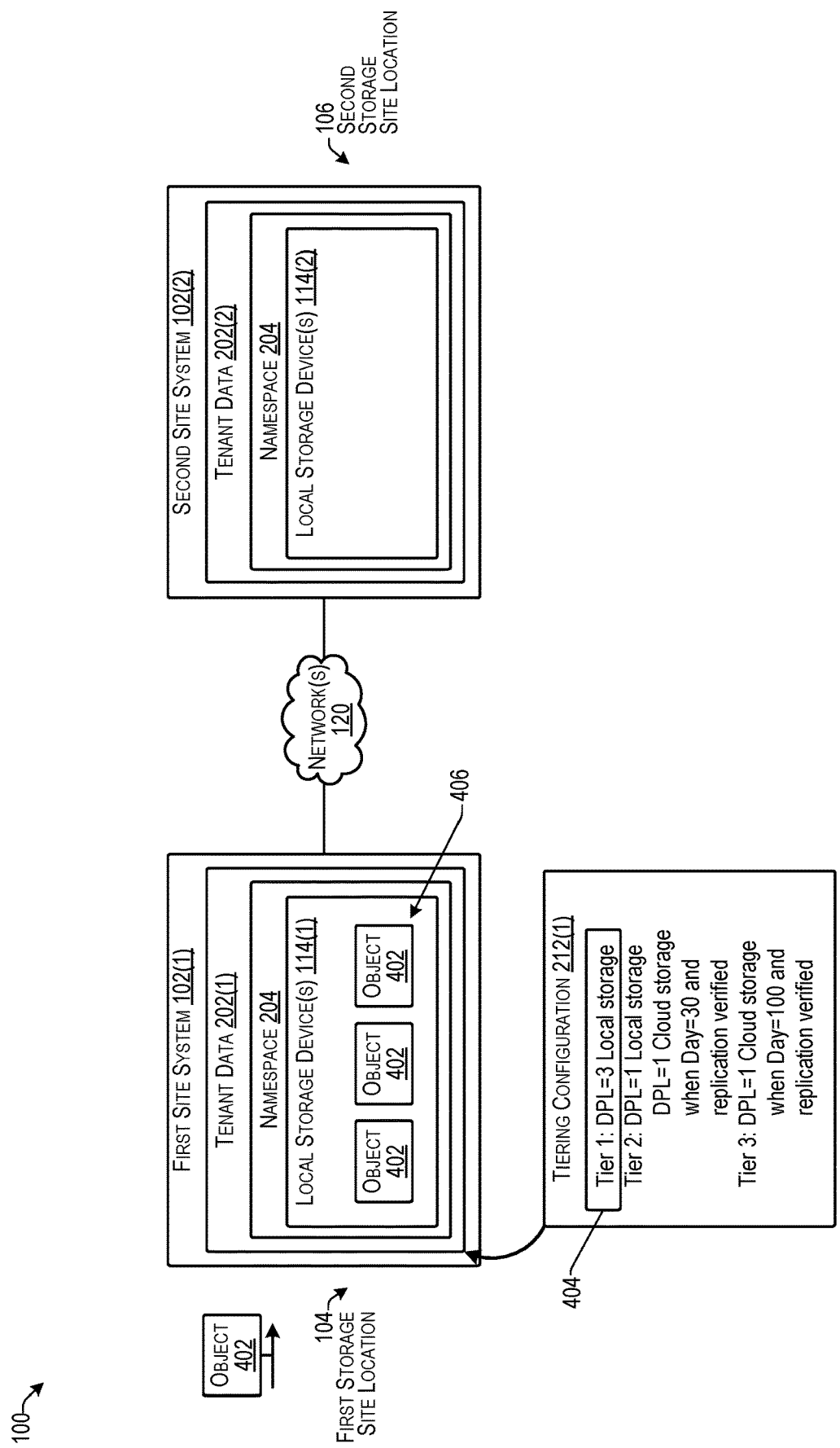
FIG. 4 illustrates an example of object ingestion in the geographically dispersed storage system according to some implementations.

FIG. 4 illustrates an example of object ingestion in the geographically dispersed storage system according to some implementations. When a data object 402 is ingested at the production site, i.e., the first site system 102(1) in this example, the data object has not yet been replicated. Accordingly, as indicated at 404, the storage tiering configuration 212(1) conforms to Tier 1: DPL=3 Local storage and stores three instances of the object 402 on the local storage device(s) 114(1), as indicated at 406. The setting at the data recovery site, second site system 102(2), is not relevant at this time, as the object 402 has not been replicated.

As the production site, i.e., the first site system 102(1), processes the tiering configuration 212(1) for each object, the fact that an object has not yet been verified to have been replicated prevents the first site system 102(1) from moving the object to a different storage tier that is only permitted after replication has been verified.

Figure 5:
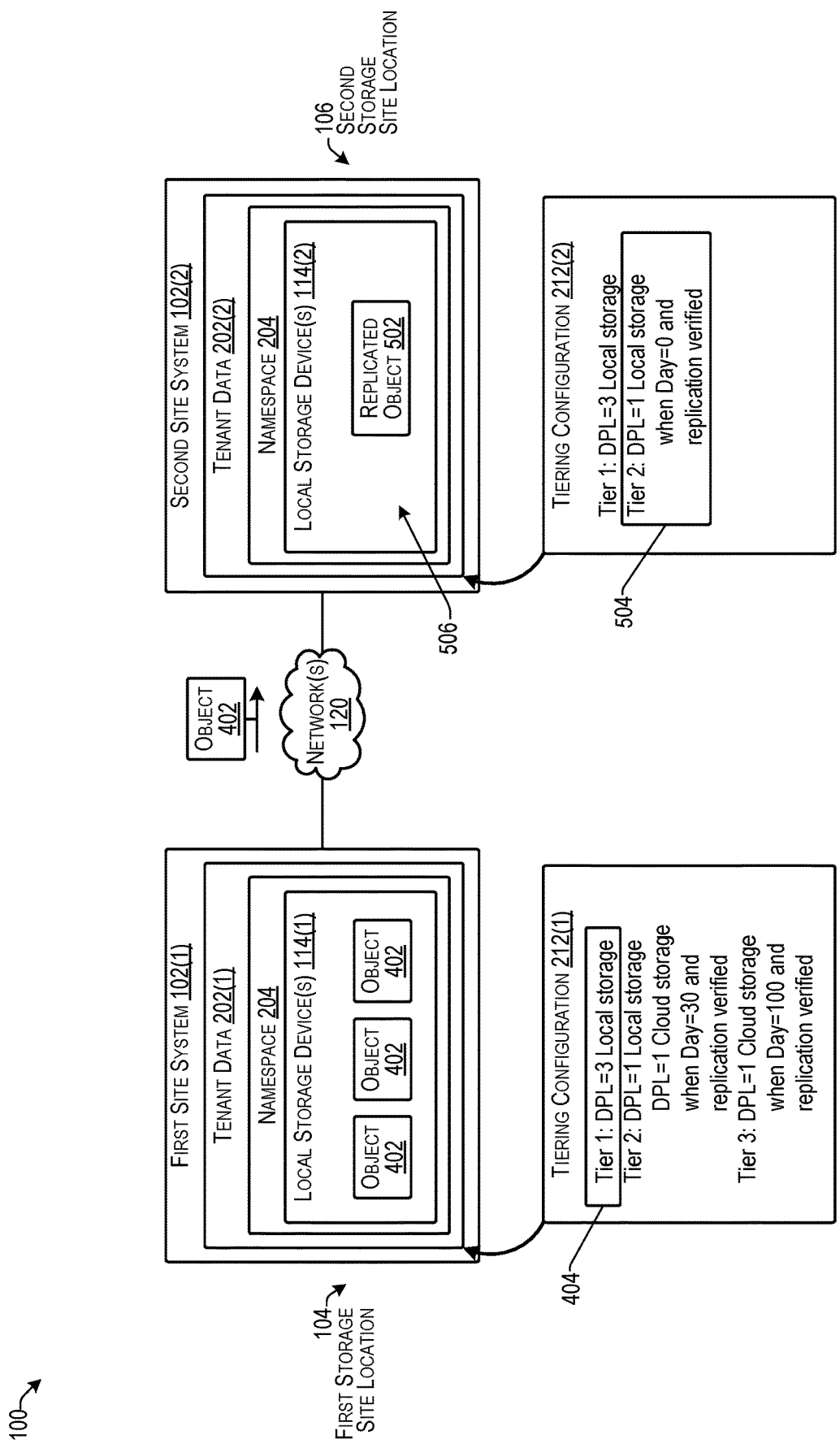
FIG. 5 illustrates an example of object replication according to some implementations.

FIG. 5 illustrates an example of object replication according to some implementations. In this example, following the ingestion described at FIG. 4, at some point in time, the first site system 102(1) sends the object 402 to the data recovery site, i.e., the second site system 102(2) in this example, to store as a replicated object 502. At the second site system 102(2), the storage tiering configuration 212(2) can immediately be honored, and if specified, the replicated object 502 may be transitioned to a subsequent storage tier. In this case, as specified by the tiering configuration 212(2), the second site system 102(2) may place the replicated object 502 in the Tier 2 storage because the replicated object 502 has been replicated, and the time condition has been met, as indicated at 504. Thus, the replicated object 502 may be stored with DPL=1 Local storage on local storage devices 114(2), as indicated at 506.

In addition, some implementations herein may not consider the time condition requirement. For instance, if the tiering configuration only applied to locally ingested objects, the second site system 102(2) may still store the replicated object 502 at Tier 2, even if the time condition is a non-zero value because the stored object is a replicated object, rather than an ingested object.

Figure 6:
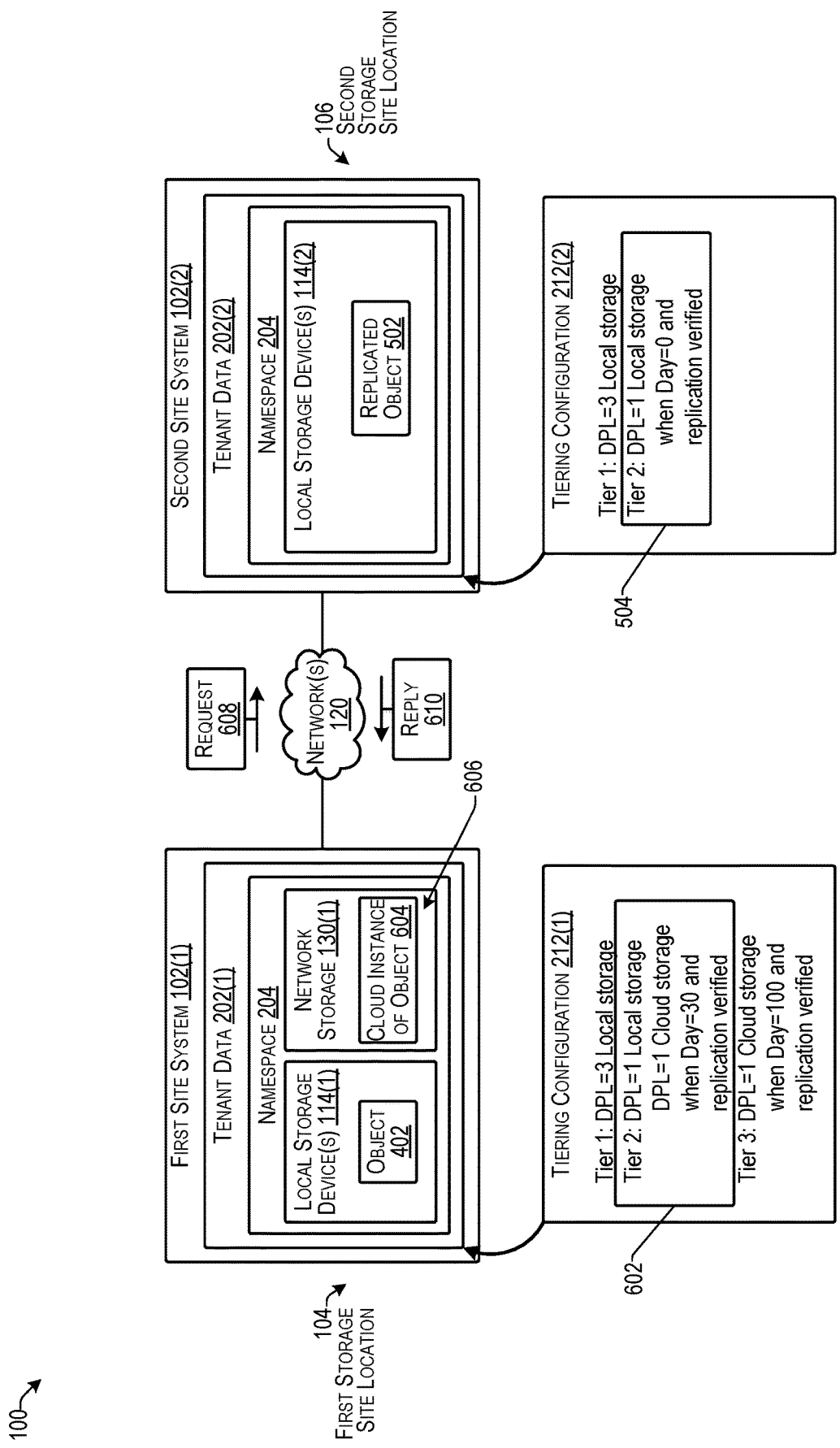
FIG. 6 illustrates an example production site activity after replication according to some implementations.

FIG. 6 illustrates an example production site activity after replication according to some implementations. In this example, after the first site system 102(1) verifies that replication has been performed at the second site system 102(2), the first site system 102(1) may check to whether conditions for transitioning the data object 402 to storage Tier 2 are met, as indicated at 602, e.g., 30 days have elapsed since ingestion and replication to the second site system 102(2) has been verified. If these conditions have been met, the first site system 102(1) may delete two of the instances of the object 402 from the local storage devices 114(1), and may store a cloud instance 604 of the object on the network storage 130(1), as indicated at 606, to conform with the Tier 2 storage requirements, i.e., DPL=1 Local storage and DPL=1 Cloud storage.

To verify that replication has been successfully performed at the second site system 102(2), the first site system 102(1) may perform a robust and efficient replication verification process that may include two layers: (1) First, the first site system 102(1) may use locally available information about the object 402 to determine if an instance of the object 402 was sent to the second site system 102(2) for replication. This check does not use up significant computer resources, as it may typically only involve accessing a local data structure such as the metadata data structure 116(1) discussed above with respect to FIG. 1, or any other data structure that may be maintained by the first site system 102(1) for such a purpose. Next, (2) if the locally available information indicates that the object 402 is likely replicated (e.g., was sent to the second site system 102(2) with a replication request, the first site system 102(1) sends a request 608 to the second site system 102(2) to verify whether that system has a valid replicated object 502 stored thereon. This is a more expensive operation from a computational resource and network resource point of view, and is therefore only performed if the first verification step shows that the object has likely been replicated.

In response to the request 608, the second site system 102(2) may check a data structure, such as the metadata data structure 116(2) discussed above with respect to FIG. 1, to determine whether the object 402 was received and stored as the replicated object 502. The second site system 102(2) may send a reply 610 that indicates whether the replicated object 502 has been stored at the second site system 102(2).

The dual-step verification process herein ensures that system-wide DPL levels are relaxed only after successful replication has verified, while minimizing the impact of overhead associated with performing the replication verification steps for potentially a very large number of objects. If verification is not successful, i.e., the reply indicates that the second site system 102(2) has not stored the replicated object, then the first site system 102(1) may either resend the object 402 for replication, or may wait for an additional period of time, e.g., until day 100 is reached, and may again send the request 608 for replication verification.

In addition, when the storage tiering management logic determines that successful replication has taken place, a subsequent data protection level and storage placement can be considered. In the illustrated example, the specified next data protection level is DPL=1 Local storage, with one instance of the object stored locally on internal disks 114(2), and DPL=1 Cloud storage, with one instance of the object stored at the network storage location 130(1).

Figure 7:
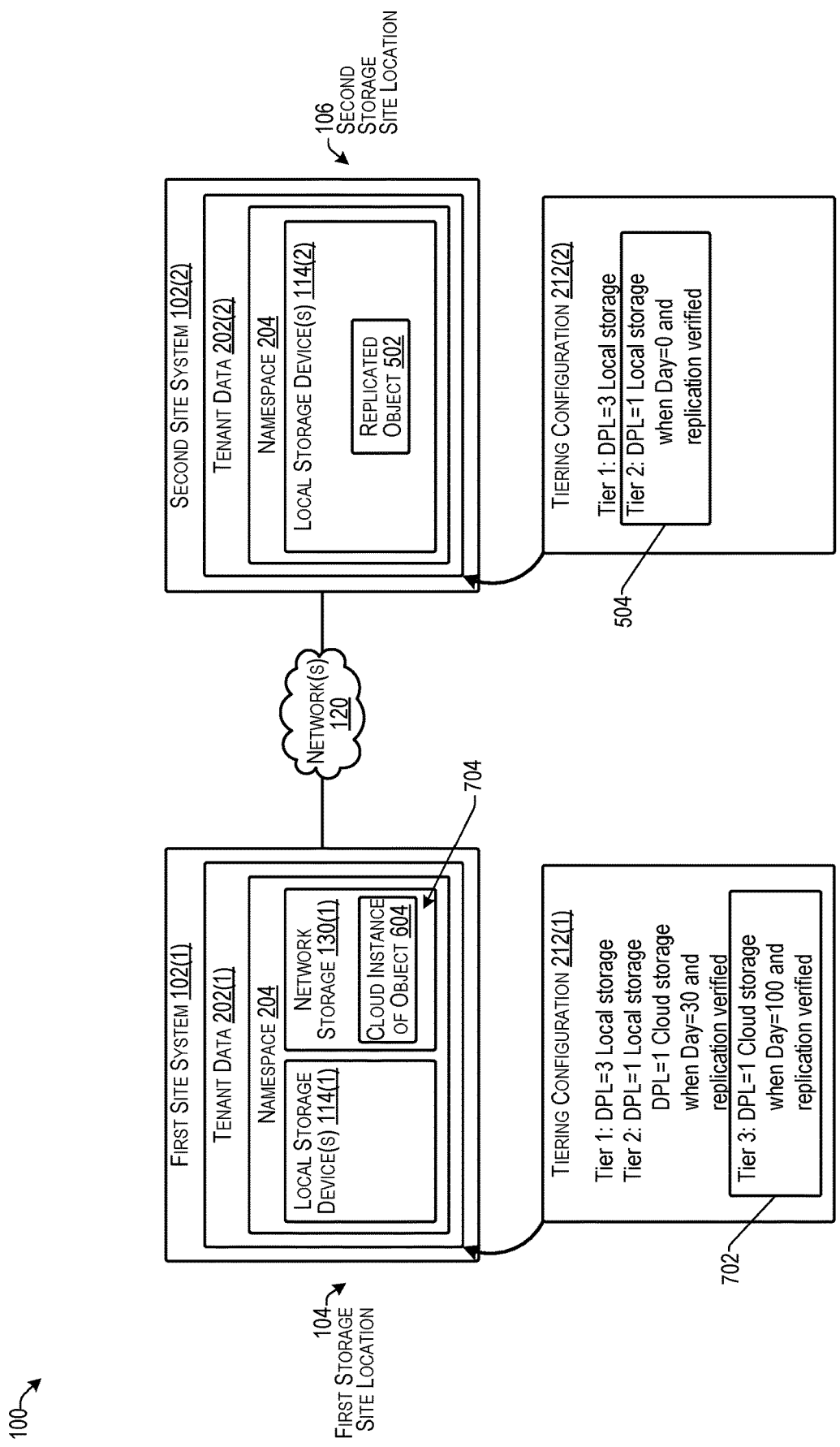
FIG. 7 illustrates an example of transitioning an object to a next storage tier according to some implementations.

FIG. 7 illustrates an example of transitioning an object to a next storage tier according to some implementations. In this example, after 100 days have elapsed since ingestion of the object 402, the next significant event in the storage tiering configuration 212(1) may trigger the first site system 102(1) to transition the object to Tier 3 storage, as indicated at 702. For example, at this point, the data protection level is able be relaxed, as 100 days have elapsed since ingestion and replication of the object to the second site system 102(2) has been verified. According to storage Tier 3, the desired DPL=1 Cloud storage instance 604 of the object remains stored at the network storage 130(1), as indicated at 704.

Furthermore, in the situation in which replication verification indicated that replication had not been completed by day 30, the first site system 102(1) may send a request to the second site system 102(2) for verification that replication has been completed. If the second site system 102(2) replies that replication has been completed, the first site system 102(1) may proceed with transitioning the object to the Tier 3 storage. On the other hand, if the reply from the second site system 102(2) indicates that replication has not been completed, the first site system 102(1) may be send the data object to the second site system 102(2) for storage as a replicated object.

Figure 8:
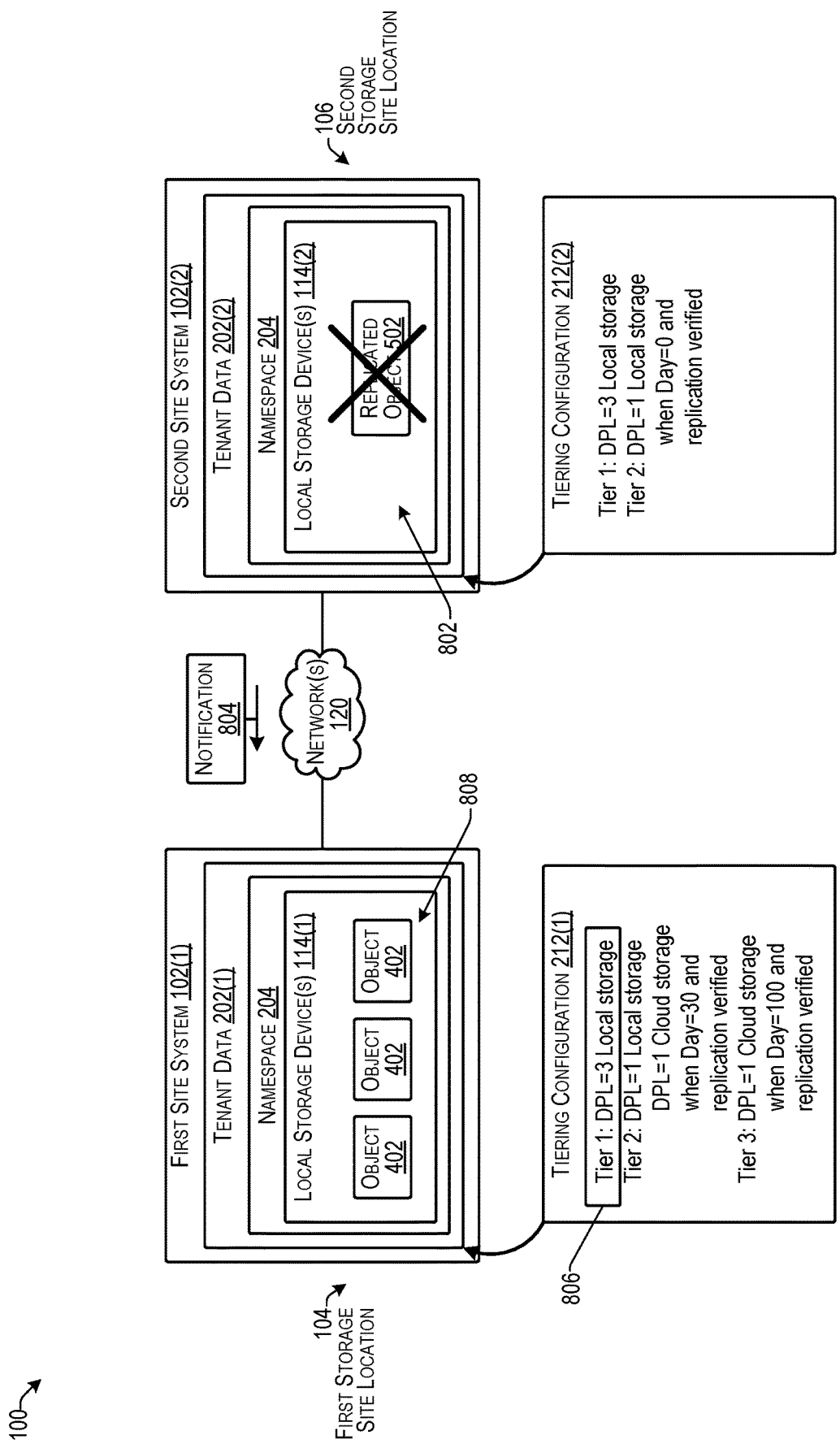
FIG. 8 illustrates an example of actions that may be performed following the loss of a replicated object at the data recovery site according to some implementations.

FIG. 8 illustrates an example of actions that may be performed following the loss of a replicated object at the data recovery site according to some implementations. For example, to maintain service level agreements that specify specific data protection levels and object placements, while considering the entire topology of the geographically dispersed storage system 100, the storage system 100 must react to failure conditions that may arise during each object's storage life cycle. One such failure condition that may occur is the loss of the replicated object at the data recovery site, i.e., the second site system 102(2) in this example. In some cases, the second site system 102(2) may be able to recover from a failure scenario automatically (for example, by reconstructing lost data, or restoring lost data from a known good instance if additional instances are available). However, if the second site system 102(2) is unable to do so, or is unable to do so in a timely manner, the first site system 102(1) may reevaluate its current storage tiering configuration for that object. In particular, since the replication criteria for the object is no longer met, the first site system 102(1) may be required to increase its data protection level to the point at which replication has not been performed or verified.

In the illustrated example, suppose that the replicated object 502 has been lost at the second site system 102(2), as indicated at 802. For instance, the second site system 102(2) may send a notification 804, or the like to the first site system 102(1) to notify the first site system 102(1) that the replicated object 502 has been lost, deleted, destroyed, or the like. In response, the first site system 102(1) may revert to Tier 1 storage for the object 402, as indicated at 806. Accordingly, as indicated at 808, the first site system 102(1) may store three instances of the object 402 on the local storage devices 114(1), such as by retrieving the object 402 from the network storage 130(1) (not shown in FIG. 8). This state may be maintained until the object 402 is successfully replicated again, at which time the data protection level can again be relaxed to Tier 3 storage.

Figure 9:
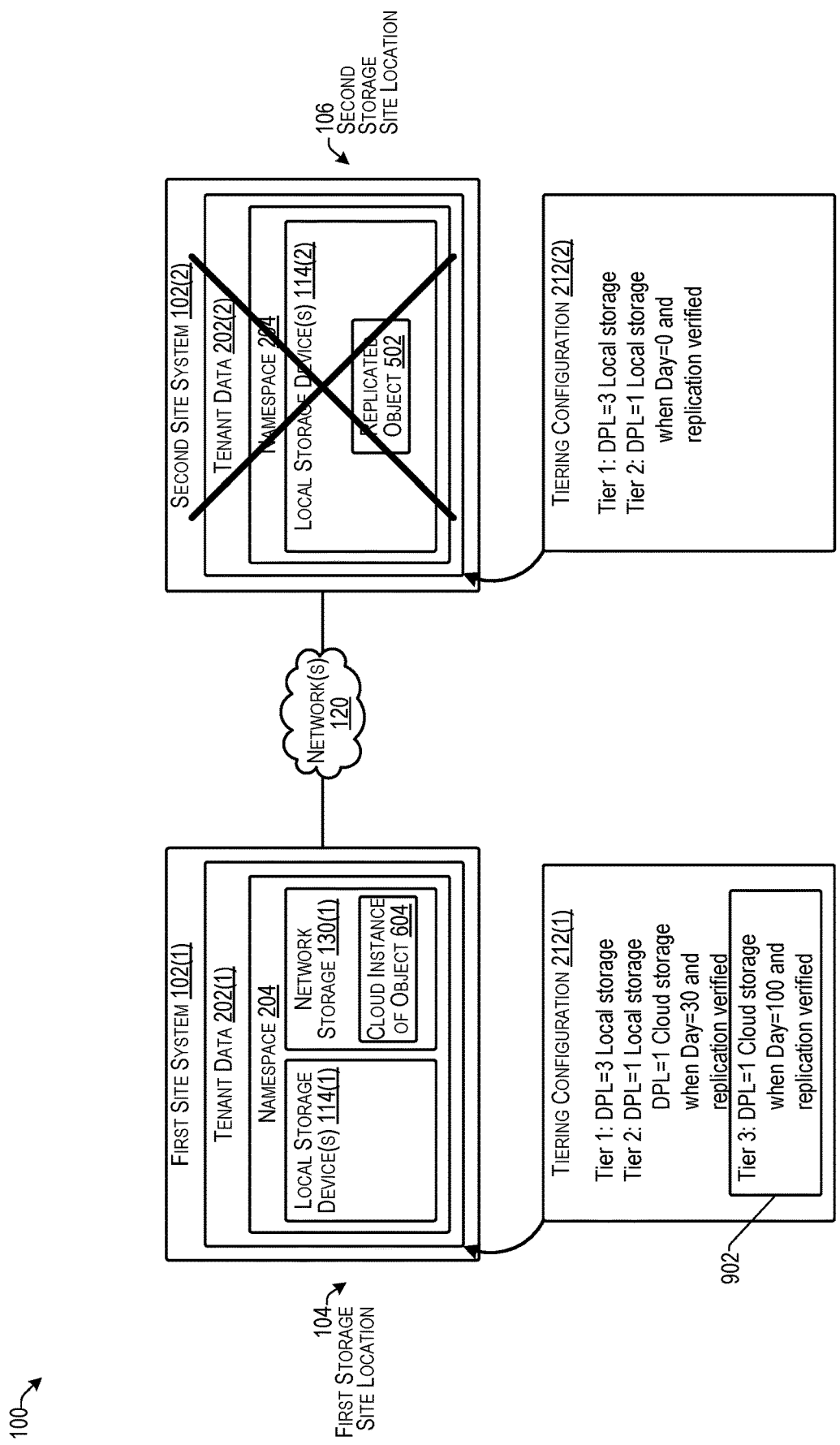
FIG. 9 illustrates an example of the loss of the data recovery site according to some implementations.

FIG. 9 illustrates an example of the loss of the data recovery site according to some implementations. In this example, if first site system 102(1) (e.g., the production site) detects that the second site system 102(2) (e.g., the data recovery site) is no longer available, the first site system 102(1) may not automatically increase the DPL level for all of the stored objects, unlike the example discussed above with respect to FIG. 8. For instance, entire site losses may typically be temporary, such as merely being a communication issue between the two sites, temporary outage, or the like. Accordingly, increasing the storage tiering and DPL level for a large number of objects would be very disruptive to the first site system 102(1). Instead, in this case, an administrative intervention may be performed, if necessary, to determine whether the DPL should be increased for all the objects replicated to the second site system 102(2), or if the first site system 102(1) should maintain a steady state until the loss of the second site system 102(2) is resolved.

Furthermore, in the opposite situation, i.e., when the first site system 102(1) becomes inoperative for an extended period of time, users may fail over their production loads to the second site system 102(2). The only difference in the behavior is that existing replicated objects at the second site system 102(2) may not automatically have their DPL levels increased. However, but any newly ingested objects would be ingested at Tier 1 at the second site system 102(2), as specified in the tiering configuration 212(2).

Figure 10:
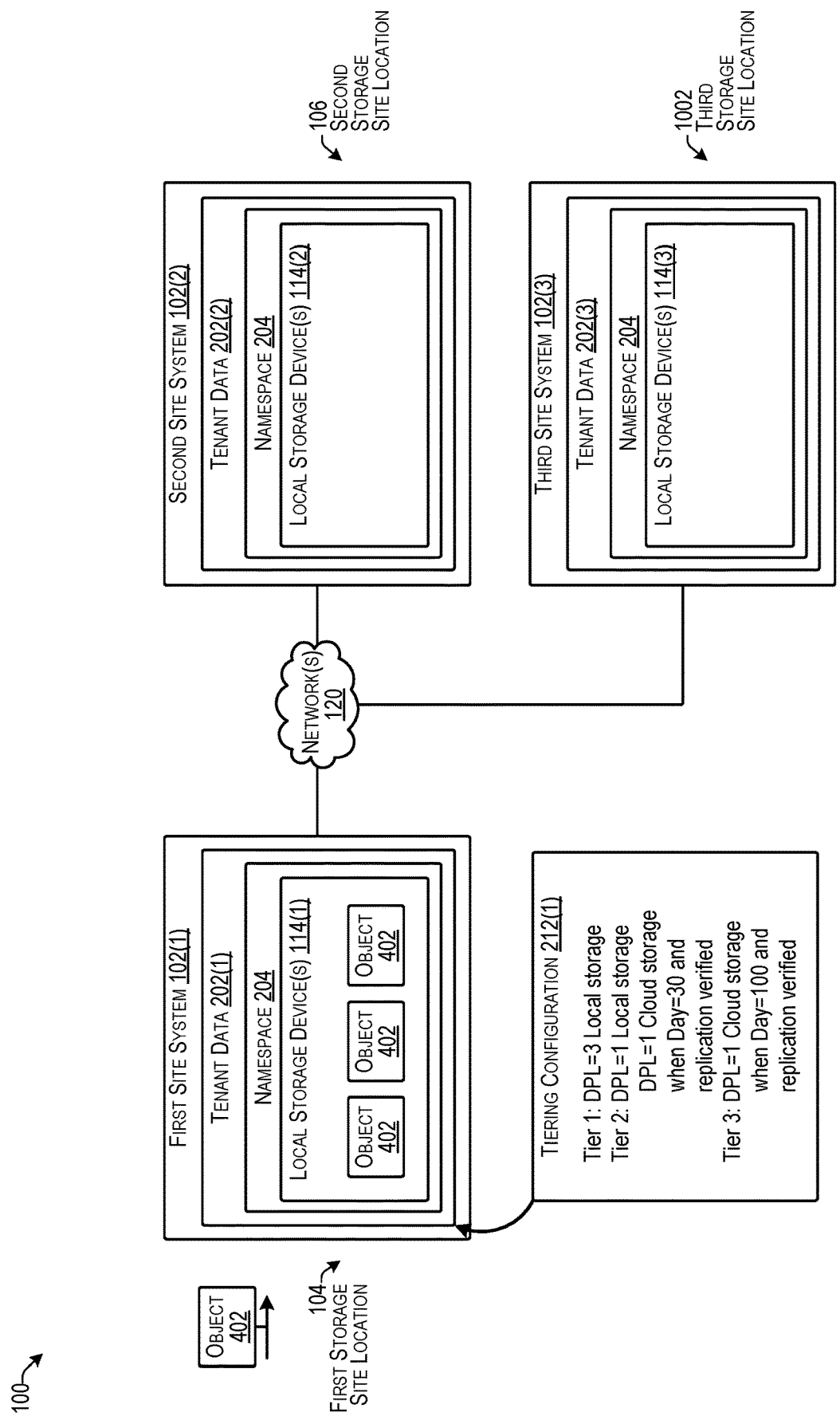
FIG. 10 illustrates an example of the storage system in which there are two data recover sites according to some implementations.

FIG. 10 illustrates an example of the storage system 100 in which there are two data recover sites according to some implementations. Some implementations of the geographically dispersed replication storage system 100 herein may include a three-site replicated topology, in which the first site system 102(1) may be considered the production site, and the second site system 102(2) and a third site system 102(3) may be data recovery sites for the first site system 102(1). For instance, the third site system 102(3) may be located at a third storage site location 1002 that is geographically dispersed from at least the first site system 102(1).

In this configuration, when the object 402 is ingested at the first site system 102(1), the first site system 102(1) may implement Tier 1 storage as discussed above. However, logic may be built into the tiering configuration 212(1) such that the storage tier and data protection policy may be dependent not only on whether the object has been replicated, but the storage tiers and data protection levels may be adjusted as an object is replicated to one or both of the other sites. For example, after the object 402 is replicated to the second site system 102(2), the storage tier at the first site system 102(1) may be lowered from Tier 1 to Tier 2, i.e., from DPL=3 Local storage to DPL=1 Local storage instance and DPL=1 Cloud storage instance. Further, after the object 402 is also replicated to the third site system 102(3) the storage tier at the first site system 102(1) may be further lowered from Tier 2 to Tier 3, i.e., to DPL=1 Cloud storage instance of the object.

FIG. 11 illustrates an example data structure 1100 for determining whether an object is sufficiently geographically dispersed in the case of three storage sites according to some implementations. For instance, a variation on the configuration discussed above with respect to FIG. 10 may be to include geo-location information in the tiering configuration 212. In this example, some sites may be considered less secure than others, such as for geo-political or other reasons, and thus the tiering configuration 212 may specify that a replicated instance of an object at those sites might not be considered when determining replication verification.

In the data structure 1100, two of the sites may be within a threshold distance of each other that is considered too close to meet a data protection level requirement according to some implementations. For instance, with geo-location information for each site, the system may designate certain sites as "too close" to the location of other sites (e.g., within a threshold distance), which may be determined automatically by the system 100, or determined by an administrator. For example, if the third site is closer to the second site than the minimum threshold distance dictated by business continuity regulatory compliance, then replication from the second site to the third site would not be a considered a valid "safely stored instance" of an object ingested on the second site, and vice versa, but either the second site or the third site may be considered a safe replication target for an object ingested on the first site. Accordingly, users may specify geographic location information for each site, and may specify the regulatory compliance criterion for business continuity and data recovery purposes.

In the illustrated example, if an object is ingested at the first site and replicated to the second site, the replicated object may be considered to be geographically dispersed, as indicated at 1102. If an object is ingested at the first site and replicated to the third site, the replicated object may be considered to be geographically dispersed, as indicated at 1104. If an object is ingested at the second site and replicated to the first site, the replicated object may be considered to be geographically dispersed, as indicated at 1106. If an object is ingested at the second site and replicated to the third site, the replicated object may be not considered to be geographically dispersed, as indicated at 1108 because the geographic distance fails. If an object is ingested at the third site and replicated to the first site, the replicated object may be considered to be geographically dispersed, as indicated at 1110. If an object is ingested at the third site and replicated to the second site, the replicated object may be considered to be not geographically dispersed, as indicated at 1112 because the geographic distance fails.

Figure 12:
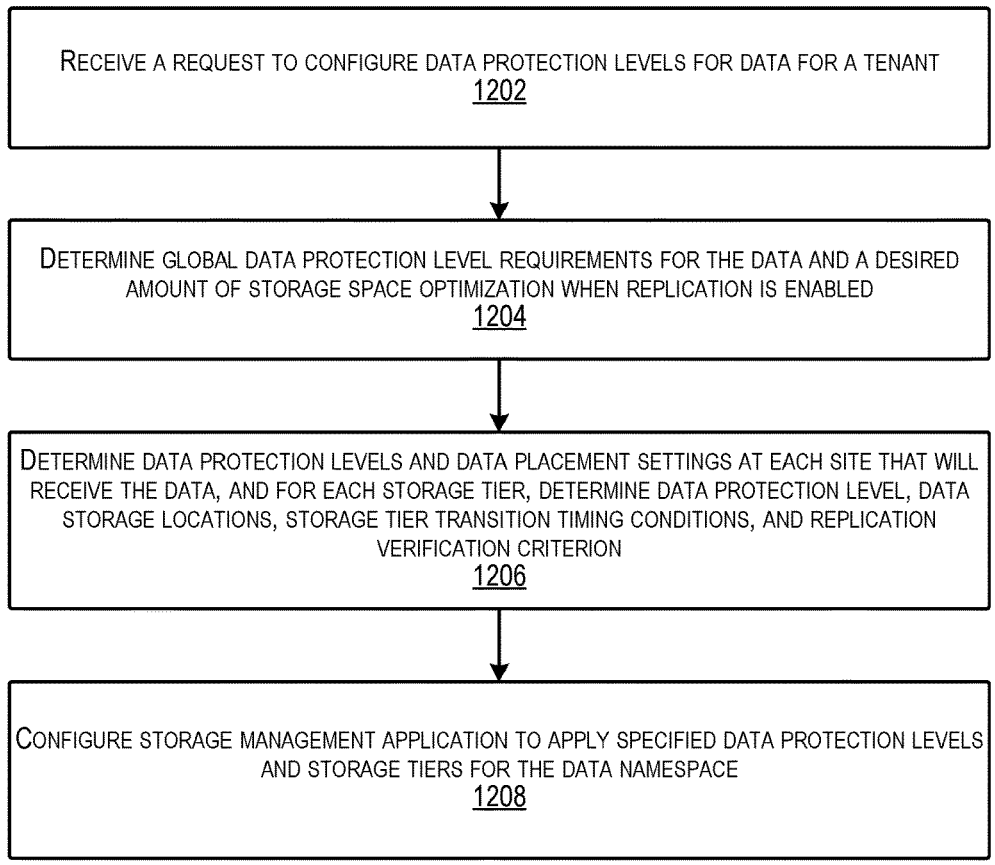
FIG. 12 is a flow diagram illustrating an example process for configuring data protection levels and data replication on a geographically dispersed object storage system according to some implementations.
Figure 13:
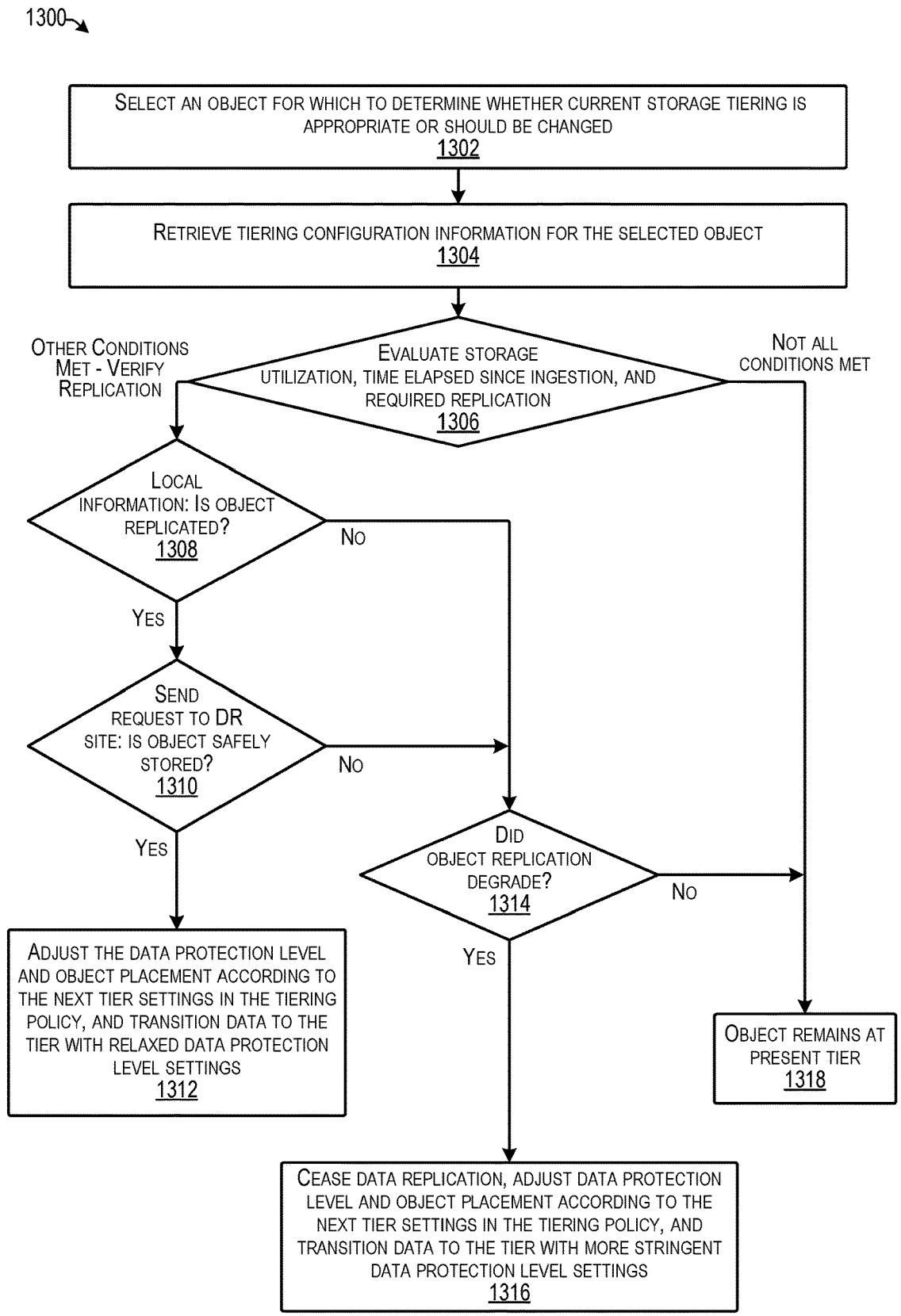
FIG. 13 is a flow diagram illustrating an example process for determining whether to transition an object to a different storage tier according to some implementations.

FIGS. 12 and 13 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 12 is a flow diagram illustrating an example process 1200 for configuring data protection levels and data replication on a geographically dispersed object storage system according to some implementations. In some cases, the process 1200 may be executed at least in part by at least one of the service computing devices 112 or other suitable computing device, such as by executing a storage management program or the like.

At 1202, the computing device may receive a request to configure data protection levels for data for a tenant.

At 1204, the computing device may determine global data protection level requirements for the data and a desired amount of storage space optimization when replication is enabled.

At 1206, the computing device may determine data protection levels and data placement settings at each site that will receive the data, and for each storage tier, may determine data protection level, data storage locations, storage tier transition timing conditions, and replication verification criterion.

At 1208, the computing device may configure a storage management application to apply specified data protection levels and storage tiers for the data namespace of the tenant.

FIG. 13 is a flow diagram illustrating an example process 1300 for determining whether to transition an object to a different storage tier according to some implementations. In some cases, the process 1300 may be executed at least in part by at least one of the service computing devices 112 or other suitable computing device such as by executing a storage management program or the like.

At 1302, the computing device may select an object for which to determine whether current storage tiering is appropriate or should be changed.

At 1304, the computing device may retrieve tiering configuration information for the selected object.

At 1306, the computing device may evaluate storage utilization, time elapsed since ingestion, and replication requirements. If all other conditions for tier transition are met, the process may go to 1308 to determine if replication has been performed and verified. If not all of the other conditions are met (e.g., amount of time elapsed since ingestion or if storage utilization is below a threshold percentage of full capacity), the process does not bother with expending additional computing resources to verify replication, and the process goes to 1318.

At 1308, if all other conditions for tier transition are met, the computing device may determine if local information indicates that the object has been replicated. If so, the process goes to 1310, if not the process goes to 1314.

At 1310, if local information indicates that the object has been replicated, but verification has not been received from the data recovery site, the computing device may send a request to the data recovery (DR) site to determine whether the replicated object is safely stored. If so, the process goes to 1312. If not, the process goes to 1314.

At 1312, based on receiving a reply from the DR site that the object has been replicated, the computing device may adjust the data protection level and object placement according to the next tier settings in the tiering policy, and transition data to the tier with more relaxed data protection level settings.

At 1314, the computing device may determine if the object replication has degraded. For example, the local information or the reply from the DR site may indicate that although replication was previously performed or verified, the object may have been corrupted, deleted, lost, or otherwise degraded. As one example, the DR site may periodically compare a hash of the originally replicated object with a hash of the current object to detect whether the replicated object has been corrupted, lost or otherwise degraded. If the object replication has degraded, the process goes to 1316. If not, the process goes to 1318.

At 1316, based on determining that the replication has degraded, the computing device may cease data replication, adjust data protection level and object placement according to the next tier settings in the tiering policy, and transition the object to the tier with more stringent data protection level settings.

At 1318, the computing device may leave the object at the current storage tier.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 14:
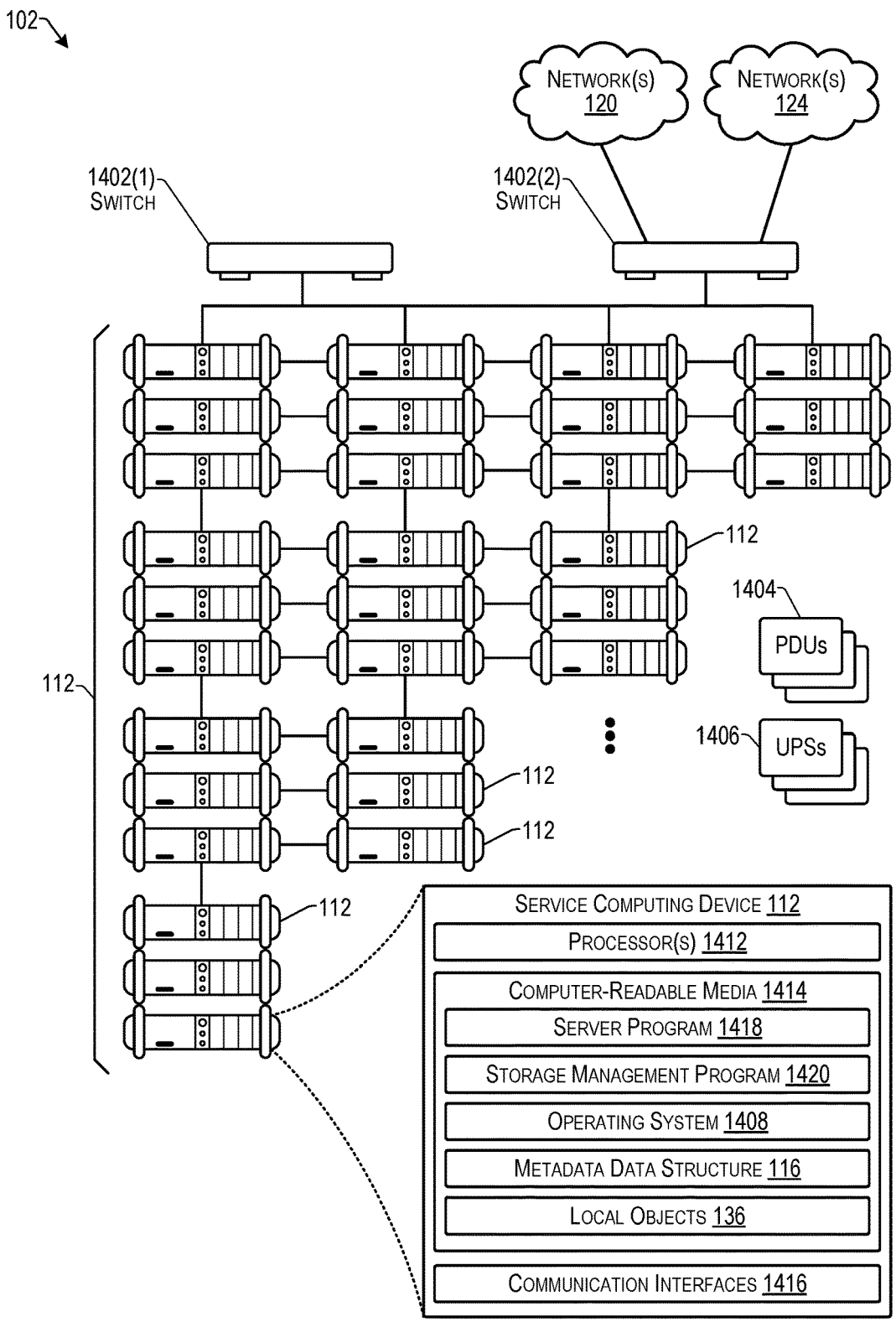
FIG. 14 illustrates an example configuration of a site system according to some implementations.

FIG. 14 illustrates an example configuration of a site system 102 according to some implementations. In this example, the site system 102 may be a cluster or other plurality of service computing devices 112 (also referred to as nodes herein) configured to be able to perform the functions of an object storage system as described herein. In some examples, the site system 102 may be referred to as a redundant array of independent nodes (RAIN) that are networked together. In the illustrated example, a plurality of the service computing devices 112 are in communication with a pair of network switches 1402. The network switches 1402 may comprise a first switch 1402(1) that serves as an internal switch to enable peer-to-peer communication between service computing devices 112, and a second switch 1402(2) that serves as an external switch to enable external access to the service computing devices 112. Each switch 1402 may include enough ports to handle all potential service computing devices 112 in a cluster or other computing system configuration.

The site system 102 in this example may also include power distribution units (PDUs) 1404 and uninterruptible power supplies (UPSs) 1406. The PDUs 1404 are used to power the service computing devices 112 and switches 1402, and the UPSs 1406 may protect the nodes and switches in case of power fluctuations and/or failures. As mentioned above, the site system 102 may be connected to a network, such as the one or more networks 120 and 124 discussed above, which may include the Internet or other WAN, a LAN, or other types of networks, as enumerated elsewhere herein.

The service computing devices 112 may be homogeneous or heterogeneous. A typical service computing device 112 may execute an operating system 1408, such as LINUX®, WINDOWS®, or the like. Additionally, some or all of the service computing devices 112 may include or may access computer-readable media 1414, such as one or more hard disk drives (HDDs) and/or one or more solid-state drives (SSDs) for storing object data and/or system data, as discussed additionally below. As one example, the service computing devices 112 may include one or more servers or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used.

In the illustrated example, an example service computing device 112 includes, or may have associated therewith, one or more processors 1412, one or more computer-readable media 1414, and one or more communication interfaces 1416. Each processor 1412 may be a single processing unit or a number of processing units, and may include single or multiple computing units or multiple processing cores. The processor(s) 1412 can be implemented as one or more central processing units, microprocessors, microcomputers, microcontrollers, digital signal processors, state machines, logic circuitries, graphics processing units, and/or any devices that manipulate signals based on operational instructions. For instance, the processor(s) 1412 may be one or more hardware processors and/or logic circuits of any suitable type specifically programmed or configured to execute the algorithms and processes described herein. The processor(s) 1412 can be configured to fetch and execute computer-readable instructions stored in the computer-readable media 1414, and these instructions can program the processor(s) 1412 to perform the functions described herein.

In some cases, the computer-readable media 1414 may include at least a portion of the local storage devices 114 discussed above with respect to FIG. 1. The local storage devices 114 may include SSDs and/or HDDs or the like. Further, the computer-readable media 1414 may include volatile and nonvolatile memory and/or removable and non-removable media implemented in any type of technology for storage of information, such as computer-readable instructions, data structures, program modules, or other data. Accordingly, the computer-readable media 1414 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the node 102, the computer-readable media 1414 may be a tangible non-transitory medium to the extent that, when mentioned, non-transitory computer-readable media exclude media such as energy, carrier signals, electromagnetic waves, and/or signals per se.

The computer-readable media 1414 may be used to store any number of functional components that are executable by the processor(s) 1412. In many implementations, these functional components may be one or more computer programs, applications, or portions thereof, executable code, or other executable instructions that are executable by the processor(s) 1412 and that, when executed, specifically program the processor(s) 1412 to perform the actions attributed herein to the service computing device(s) 112. Functional components stored in the computer-readable media 1414 may include a server program 1418 that may communicate with the client devices such as for sending data objects to the client devices and receiving data objects from the client devices. The functional components may further include a storage management program 1420, which may determine storage tiers and data protection levels for storing data, such as by performing the algorithm discussed above, e.g., with respect to FIG. 12. In addition, the storage management program 1420 may send objects for replication, and may determine when to transition an object from one storage tier to another, such as by performing the algorithm described above with respect to FIG. 13. Additional functional components stored in the computer-readable media 1414 may include the operating system 1408 for controlling and managing various functions of the service computing devices 112. As one example, these functional components may be stored in a storage portion of the computer-readable media 1414, loaded into a local memory portion of the computer-readable media 1414, and executed by the one or more processors 1412.

In addition, the computer-readable media 1414 may store data and data structures used for performing the functions and services described herein. For example, the computer-readable media 1414 may store the metadata data structure 116 for maintaining metadata about the objects stored by the system 102. In addition, the computer-readable media 1414 may store the local objects 136. The service computing devices 112 may also include or maintain other functional components and data, which may include programs, drivers, etc., and the data used or generated by the functional components. Further, the service computing devices 112 may include many other logical, programmatic, and physical components, of which those described above are merely examples that are related to the discussion herein.

The communication interface(s) 1416 may include one or more interfaces and hardware components for enabling communication with various other devices, such as over the network(s) 120 and 124 discussed above. For example, communication interface(s) 1416 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein. Further, the example of the site system 102 described above is but one example of a site system 102 suitable for use as an object storage system that may perform the functions described in the examples herein.

Figure 15:
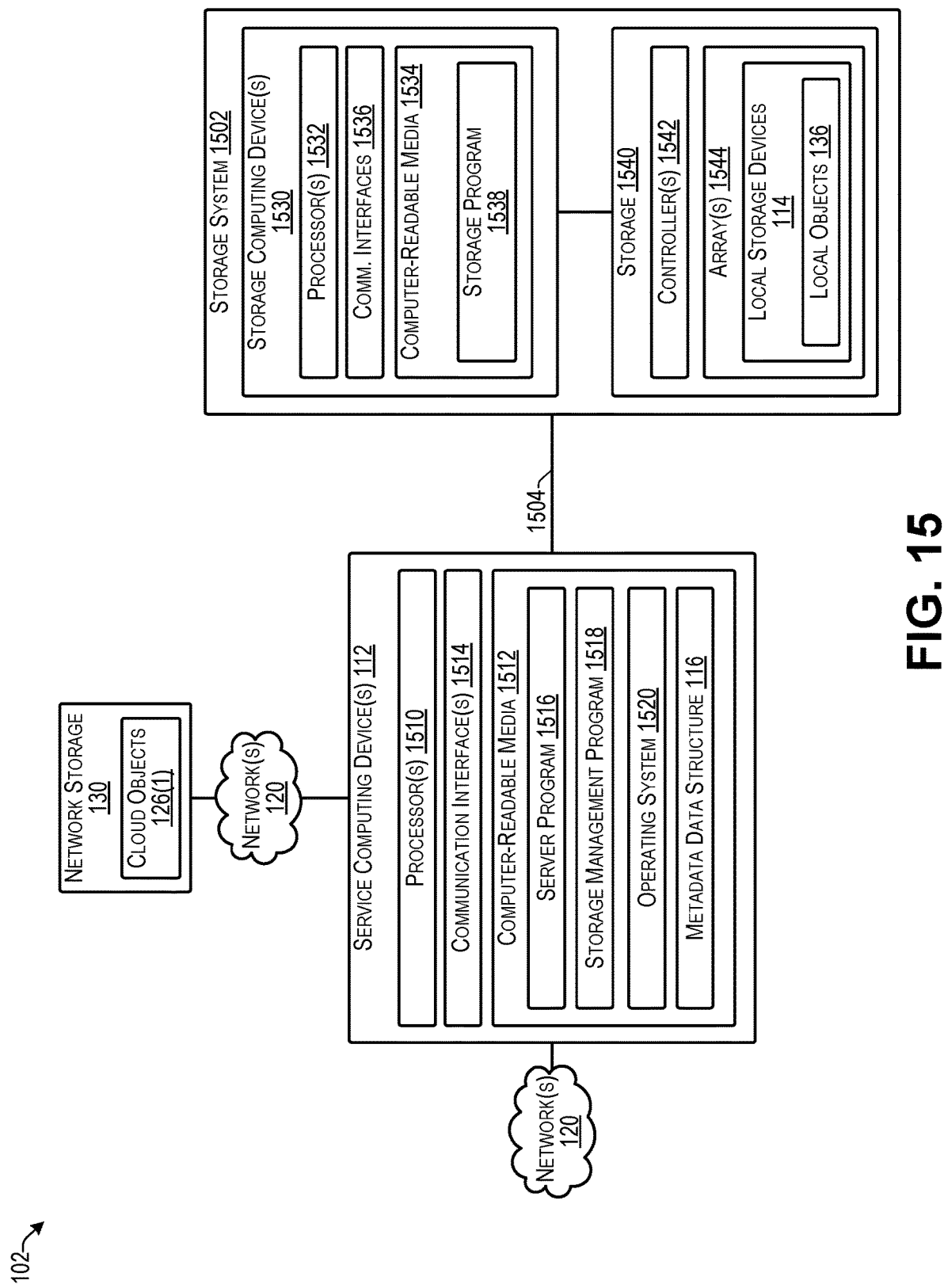
FIG. 15 illustrates an example configuration of a site system according to some implementations.

FIG. 15 illustrates an example configuration of a site system 102 according to some implementations. The system 102 includes a least one service computing device 112 that is able to communicate with, or is otherwise coupled to, a storage system 1502, such as through one or more networks 1504. Typically, the one or more networks 1504 may include a LAN, a storage area network (SAN), such as a Fibre Channel network, or the like, but are not limited to such, and may include other types of networks as discussed herein, a direct connection, or the like.

In some examples, the at least one service computing device 112 may include one or more servers or other types of computing devices that may be embodied in any number of ways. For instance, in the case of a server, the programs, other functional components, and at least a portion of data storage may be implemented on at least one server, such as in a plurality of servers, a server farm, a data center, a cloud-hosted computing service, and so forth, although other computer architectures may additionally or alternatively be used. In the illustrated example, the service computing device 112 includes, or may have associated therewith, one or more processors 1510, one or more computer-readable media 1512, and one or more communication interfaces 1514.

Each processor 1510 may be a single processing unit or a number of processing units, and may include single or multiple computing units, or multiple processing cores. The processor(s) 1510 can be implemented as one or more central processing units, microprocessors, microcomputers, microcontrollers, digital signal processors, state machines, logic circuitries, graphics processors, and/or any devices that manipulate signals based on operational instructions. As one example, the processor(s) 1510 may include one or more hardware processors and/or logic circuits of any suitable type specifically programmed or configured to execute the algorithms and processes described herein. The processor(s) 1510 may be configured to fetch and execute computer-readable instructions stored in the computer-readable media 1512, which may be executed to program the processor(s) 1510 to perform the functions described herein.

The computer-readable media 1512 may include volatile and nonvolatile memory and/or removable and non-removable media implemented in any type of technology for storage of information, such as computer-readable instructions, data structures, program modules, or other data. For example, the computer-readable media 1512 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 112, the computer-readable media 1512 may be a tangible non-transitory medium to the extent that, when mentioned, non-transitory computer-readable media exclude media such as energy, carrier signals, electromagnetic waves, and/or signals per se. In some cases, the computer-readable media 1512 may be at the same location as the service computing device 112, while in other examples, the computer-readable media 1512 may be partially remote from the service computing device 112. For instance, in some cases, the computer-readable media 1512 may include a portion of storage in the storage system 1502.

The computer-readable media 1512 may be used to store any number of functional components that are executable by the processor(s) 1510. In many implementations, these functional components comprise instructions or programs that are executable by the processor(s) 1510 and that, when executed, specifically program the processor(s) 1510 to perform the actions attributed herein to the service computing device 112. Functional components stored in the computer-readable media 1512 may include a server program 1516 that may communicate with the client devices such as for sending data objects to the client devices and receiving data objects from the client devices. The functional components may further include a storage management program 1518, which may determine storage tiers and data protection levels for storing data, such as by performing the algorithm discussed above, e.g., with respect to FIG. 12. In addition, the storage management program 1518 may send objects for replication, and may determine when to transition an object from one storage tier to another, such as by performing the algorithm described above with respect to FIG. 13. Additional functional components stored in the computer-readable media 1512 may include an operating system 1520 for controlling and managing various functions of the service computing device 112. In some cases, the functional components may be stored in a storage portion of the computer-readable media 1512, loaded into a local memory portion of the computer-readable media 1512, and executed by the one or more processors 1510.

In addition, the computer-readable media 1512 may store data and data structures used for performing the functions and services described herein. For example, the computer-readable media 1512 may store the metadata data structure 116. The service computing device 112 may also include or maintain other functional components and data, which may include programs, drivers, etc., and the data used or generated by the functional components. Further, the service computing device 112 may include many other logical, programmatic, and physical components, of which those described above are merely examples that are related to the discussion herein.

The communication interface(s) 1514 may include one or more interfaces and hardware components for enabling communication with various other devices, such as over the one or more network(s) 120, 124 and 1504. Thus, the communication interfaces 1514 may include, or may couple to, one or more ports that provide connection for communicating with the storage system 1502, and one or more ports that provide connection to the network(s) 120 for communication with the client devices 108. For example, the communication interface(s) 1514 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The storage system 1502 may include one or more storage computing devices 1530, which may include one or more servers or any other suitable computing device, such as any of the examples discussed above with respect to the service computing device 112. The storage computing device(s) 1530 may each include one or more processors 1532, one or more computer-readable media 1534, and one or more communication interfaces 1536. For example, the processors 1532 may correspond to any of the examples discussed above with respect to the processors 1510, the computer-readable media 1534 may correspond to any of the examples discussed above with respect to the computer-readable media 1512, and the communication interfaces 1536 may correspond to any of the examples discussed above with respect to the communication interfaces 1514.

In addition, the computer-readable media 1534 may include a storage program 1538 as a functional component executed by the one or more processors 1532 for managing the storage of data on a storage 1540 included in the storage system 1502. The storage 1540 may include one or more controllers 1542 associated with the storage 1540 for storing data on one or more arrays 1544 of local storage devices 114. For instance, the controller 1542 may control the arrays 1544, such as for configuring the arrays 1544 in a RAID configuration, or any other suitable storage configuration, and/or for presenting logical units based on the local storage devices 114 to the storage program 1538, and for managing data, such as local objects 136, stored on the underlying physical storage devices 114. The local storage devices 114 may be any type of storage device, such as hard disk drives, solid state drives, optical drives, magnetic tape, combinations thereof, and so forth. Additionally, while several example systems have been described, numerous other systems able to implement the distributed object storage and replication techniques herein will be apparent to those of skill in the art having the benefit of the disclosure herein.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more non-transitory computer-readable media maintaining executable instructions, which, when executed by the one or more processors, configure the one or more processors to perform operations comprising:
receiving a data object at the system, the data object including object data, wherein the system is a first system at a first site and is configured to communicate with a second system at a second site that is geographically remote from the first site;
storing the data object at the first site according to a first data protection level;
sending an instance of the data object to the second system at the second site for storing as a replicated data object;
determining whether a time condition for transitioning the data object to a different data protection level has been met based at least on comparing a time that has elapsed following ingestion of the data object at the first site to an amount of time specified in tiering configuration information for the data object at the first system;
based at least on determining that the time condition for transitioning the data object to the different data protection level has been met, checking a local data structure to determine that the instance of the data object was sent to the second system;
based on determining that the local data structure indicates that the data object was sent for replication to the second system, sending a request to the second system to verify storage of the replicated data object; and
based on receiving a reply from the second system indicating storage of the replicated data object at the second system, transitioning the data object to the different data protection level at the first system.

2. The system as recited in claim 1, wherein the operation of transitioning the data object to the different data protection level at the first system comprises referring to the tiering configuration information specified for the data object to determine at least one of:
where to store the data object at the first system, or
a number instances of the data object to store at the first system.

3. The system as recited in claim 1, wherein the operation of transitioning the data object to the different data protection level at the first system comprises:
storing, by the first system, an instance of the data object at a network location; and
deleting at least one instance of the data object from a local storage device at the first system.

4. The system as recited in claim 1, wherein:
the first data protection level includes storing multiple instances of the data object on a local storage device at the first system; and
the different data protection level includes storing fewer instances of the data object at the first system.

5. The system as recited in claim 1, the operations further comprising:
receiving, from the second site, a notification that the replicated data object is at least one of lost or degraded; and
transitioning the data object stored at the first site back to the first data protection level.

6. The system as recited in claim 1, wherein the different data protection level is a second data protection level, the operations further comprising:
determining that an additional time condition has been met at the first system following receipt of the data object at the first system; and
based at least on the additional time condition, and based on determining that the second system has already verified storage of the replicated data object, transitioning the data object to a third data protection level that is less protective than the second data protection level.

7. A method comprising:
receiving, by one or more processors of a first system, a data object at the first system, wherein the first system is at a first site and is configured to communicate with a second system at a second site that is geographically remote from the first site;
storing, by the one or more processors, the data object at the first site according to a first data protection level;
sending, by the one or more processors, an instance of the data object to the second system for storing as a replicated data object;
determining, by the one or more processors, whether a time condition for transitioning the data object to a different data protection level has been met based at least on comparing a time that has elapsed following ingestion of the data object at the first site to an amount of time specified in tiering configuration information for the data object at the first system;
based on determining that the time condition for transitioning the data object to the different data protection level has been met, checking, by the one or more processors, a local data structure to determine whether the instance of the data object was sent to the second system;
based on determining that the local data structure indicates that the data object was sent for replication to the second system, sending, by the one or more processors, a request to the second system to verify storage of the replicated data object at the second system; and
based on receiving a reply indicating storage of the replicated data object, transitioning, by the one or more processors, the data object to the different data protection level at the first system.

8. The method as recited in claim 7, wherein transitioning the data object to the different data protection level at the first system comprises referring to the tiering configuration information specified for the data object to determine at least one of:
where to store the data object at the first system, or
a number of instances of the data object to store at the first system.

9. The method as recited in claim 7, wherein transitioning the data object to the different data protection level at the first system comprises:
    storing, by the first system, an instance of the data object at a network location; and
    deleting at least one instance of the data object from a local storage device at the first system.

10. The method as recited in claim 7, wherein:
    the first data protection level includes storing multiple instances of the data object on a local storage device at the first system; and
    the different data protection level includes storing fewer instances of the data object at the first system.

11. The method as recited in claim 7, further comprising:
    receiving, from the second site, a notification that the replicated data object is at least one of lost or degraded; and
    transitioning the data object stored at the first site back to the first data protection level.

12. The method as recited in claim 7, wherein the different data protection level is a second data protection level, the method further comprising:
    determining that an additional time condition has been met at the first system following receipt of the data object at the first system; and
    based at least on the additional time condition, and based on determining that the second system has already verified storage of the replicated data object, transitioning the data object to a third data protection level that is less protective than the second data protection level.

13. One or more non-transitory computer-readable media storing instructions that, when executed by one or more processors of a first system, program the one or more processors to perform operations comprising:
    receiving a data object at the first system, wherein the first system is at a first site and is configured to communicate with a second system at a second site that is geographically remote from the first site;
    storing the data object at the first site according to a first data protection level;
    sending an instance of the data object to the second system for storing as a replicated data object;
    determining whether a time condition for transitioning the data object to a different data protection level has been met based at least on comparing a time that has elapsed following ingestion of the data object at the first site to an amount of time specified in tiering configuration information for the data object at the first system;
    based on determining that the time condition for transitioning the data object to the different data protection level has been met, checking a local data structure to determine whether the instance of the data object was sent to the second system;
    based on determining that the local data structure indicates that the data object was sent for replication to the second system, sending a request to the second system to verify storage of the replicated data object at the second system; and
    based on receiving a reply indicating storage of the replicated data object, transitioning the data object to the different data protection level at the first system.

14. The one or more non-transitory computer-readable media as recited in claim 13, wherein the operation of transitioning the data object to the different data protection level at the first system comprises referring to the tiering configuration information specified for the data object to determine at least one of:
    where to store the data object at the first system, or
    a number of instances of the data object to store at the first system.

15. The one or more non-transitory computer-readable media as recited in claim 13, wherein the operation of transitioning the data object to the different data protection level at the first system comprises:
    storing, by the first system, an instance of the data object at a network location; and
    deleting at least one instance of the data object from a local storage device at the first system.

16. The one or more non-transitory computer-readable media as recited in claim 13, wherein:
    the first data protection level includes storing multiple instances of the data object on a local storage device at the first system; and
    the different data protection level includes storing fewer instances of the data object at the first system.

17. The one or more non-transitory computer-readable media as recited in claim 13, the operations further comprising:
    receiving, from the second site, a notification that the replicated data object is at least one of lost or degraded; and
    transitioning the data object stored at the first site back to the first data protection level.

18. The one or more non-transitory computer-readable media as recited in claim 13, wherein the different data protection level is a second data protection level, the operations further comprising:
    determining that an additional time condition has been met at the first system following receipt of the data object at the first system; and
    based at least on the additional time condition, and based on determining that the second system has already verified storage of the replicated data object, transitioning the data object to a third data protection level that is less protective than the second data protection level.

* * * * *